(12) United States Patent
Divakara

(10) Patent No.: US 11,715,358 B2
(45) Date of Patent: *Aug. 1, 2023

(54) SYSTEM AND METHOD FOR DETECTING EVENTS IN A SYSTEM

(71) Applicant: Honeywell International Inc., Charlotte, NC (US)

(72) Inventor: Manjunatha Divakara, Tumkur (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/673,422

(22) Filed: Feb. 16, 2022

(65) Prior Publication Data

US 2022/0327899 A1    Oct. 13, 2022

Related U.S. Application Data

(63) Continuation of application No. 17/229,163, filed on Apr. 13, 2021, now Pat. No. 11,276,284.

(51) Int. Cl.
*G08B 13/04* (2006.01)
*G08B 13/14* (2006.01)
(Continued)

(52) U.S. Cl.
CPC .......... *G08B 13/1436* (2013.01); *F24F 11/63* (2018.01); *F24F 11/89* (2018.01);
(Continued)

(58) Field of Classification Search
CPC .... G08B 13/1446; G08B 13/04; G08B 13/08; G08B 29/186; G08B 13/00; G08B 29/188;
(Continued)

(56) References Cited

U.S. PATENT DOCUMENTS 5,202,661 A    4/1993  Everett, Jr. et al.
5,517,429 A    5/1996  Harrison
(Continued)

FOREIGN PATENT DOCUMENTS

EP    3093827 B1    6/2018
EP    3301656 A3    8/2018

OTHER PUBLICATIONS

Extended European Search Report, EP Patent Application No. 22166288.5, European Patent Office, dated Sep. 9, 2022 (7 pages).

*Primary Examiner* — Ojiako K Nwugo
(74) *Attorney, Agent, or Firm* — Seager, Tufte & Wickhem, LLP

(57) ABSTRACT

A plurality of sensors are operably coupled to a system controller. Each sensor includes a detection mode in which the sensor applies one or more detection algorithms to sensor data generated by the corresponding sensor to detect a possible event and to report the possible event to the system controller, but does not report the system data to the system controller. Each sensor also includes a sensor data mode in which the sensor data is reported to the system controller. When one of the plurality of sensors reports a possible event to the system controller, the system controller instructs one or more of the plurality of sensors to switch from the detection mode to the sensor data mode. The system controller is configured to receive the sensor data and to process the received sensor data to confirm or otherwise provide a measure of confidence in the reported possible event.

20 Claims, 5 Drawing Sheets

(51) Int. Cl.
*F24F 11/63* (2018.01)
*G07C 9/28* (2020.01)
*F24F 11/89* (2018.01)
*G08B 13/08* (2006.01)

(52) U.S. Cl.
CPC ............... *G07C 9/28* (2020.01); *G08B 13/04* (2013.01); *G08B 13/08* (2013.01)

(58) Field of Classification Search
CPC .. G07C 9/28; F24F 11/63; F24F 11/89; G06N 3/08
See application file for complete search history.

(56) References Cited

U.S. PATENT DOCUMENTS

| | | | |
|---|---|---|---|
| 6,889,171 | B2 | 5/2005 | Skrbina et al. |
| 8,272,053 | B2 | 9/2012 | Markham et al. |
| 9,000,918 | B1 | 4/2015 | Mclaughlin et al. |
| 10,147,298 | B2 | 12/2018 | Ten Kate |
| 10,382,300 | B2 | 8/2019 | Ellenbogen et al. |
| 10,665,089 | B1 | 5/2020 | Trundle |
| 2006/0085854 | A1 | 4/2006 | Agrawal et al. |
| 2008/0164997 | A1* | 7/2008 | Aritsuka ............... G01S 5/0009 340/539.13 |
| 2010/0321172 | A1* | 12/2010 | Suzuki ............... B60R 25/1004 340/425.5 |
| 2011/0016993 | A1* | 1/2011 | Suzuki ................... G08B 13/04 73/865.8 |
| 2011/0063110 | A1 | 3/2011 | Habib et al. |
| 2015/0254972 | A1 | 9/2015 | Patterson et al. |
| 2016/0189526 | A1 | 6/2016 | Kennedy et al. |
| 2016/0189531 | A1 | 6/2016 | Modi et al. |
| 2017/0222976 | A1 | 8/2017 | Gross et al. |
| 2018/0210438 | A1 | 7/2018 | Ashar et al. |
| 2019/0236271 | A1 | 8/2019 | Shivanna |
| 2021/0185485 | A1 | 6/2021 | Deixler et al. |

\* cited by examiner

SYSTEM AND METHOD FOR DETECTING EVENTS IN A SYSTEM

CROSS REFERENCE TO RELATED APPLICATION

This is a continuation of co-pending U.S. patent application Ser. No. 17/229,163, filed Apr. 13, 2021, and entitled "SYSTEM AND METHOD FOR DETECTING EVENTS IN A SYSTEM", which is incorporated herein by reference.

TECHNICAL FIELD

The present disclosure relates generally to using sensor data to detect events in a system. More particularly, the present disclosure relates to using sensor data from other sensors that did not detect the event in order to confirm or otherwise generate a confidence level in the detected event.

BACKGROUND

A variety of systems use sensors to detect events within the system. For example, an intrusion system in a building uses intrusion detection sensors in order to detect intrusions (events) within the intrusion system. A Heating, Ventilating and Air Conditioning (HVAC) system uses HVAC sensors to detect events, such as stuck valves, equipment faults and the like within the HVAC system. A fire detection system uses fire detection sensors to detect fires and signs of fires (events) within the fire detection system. Other systems such as industrial process control and aerospace use a variety of sensors to detect possible events within their systems. Systems that rely upon sensors for detecting events can suffer from false alarms. What would be desirable are methods and systems for reducing such false alarms.

SUMMARY

The present disclosure relates to using sensor data to detect events in a system. This can apply to any of a variety of different types of systems. In one illustrative but non-limiting example, an intrusion detection system includes an intrusion detection controller and a plurality of sensors that are operably coupled to the intrusion detection controller. Each of the plurality of sensors is configured to include a detection mode in which the sensor applies one or more detection algorithms to sensor data generated by the corresponding sensor to detect a possible intrusion event and to report the possible intrusion event to the intrusion detection controller. In the detection mode, the sensor data is not reported to the intrusion detection controller. Each of the plurality of sensors is also configure to includes a sensor data mode in which the sensor data is reported to the intrusion detection controller. When one of the plurality of sensors reports a possible intrusion event to the intrusion detection controller, the intrusion detection controller is configured to instruct one or more of the plurality of sensors, other than the one of the plurality of sensors that reported the possible intrusion event, to switch from the detection mode to the sensor data mode. The intrusion detection controller is configured to receive the sensor data from the one or more of the plurality of sensors that were switched to the sensor data mode and to process the received sensor data to confirm or otherwise provide a measure of confidence in the reported possible intrusion event. In some cases, the intrusion detection controller may also switch the sensor that reported the possible intrusion event to the sensor data mode and process the received sensor data.

In another example, a method for detecting events using a plurality of sensors is provided. Each of the sensors includes a detection mode and a sensor data mode. The method includes each of the plurality of sensors operating in the detection mode. When one of the plurality of sensors detects a possible event, the sensor that detected the possible event reports the possible event. In response to the reported possible event, one or more of the plurality of sensors, other than the one of the plurality of sensors that reported the possible event, are instructed to switch from the detection mode to the sensor data mode. Sensor data is received from the one or more of the plurality of sensors that were switched to the sensor data mode and is processed to conform or otherwise determine a measure of confidence in the reported possible event. The measure of confidence in the reported possible event is reported.

In another example, a sensor is provided. The sensor includes a sensing element that is configured to sense a sensed condition and output sensor data, a transceiver and a controller that is operably coupled with the sensing element and the transceiver. The controller is configured to receive the sensor data from the sensing element and to receive instructions via the transceiver instructing the sensor to switch between a detection mode and a sensor data mode. In the detection mode, the controller applies one or more detection algorithms to the sensor data to detect a possible event and report out the possible event via the transceiver. In the detection mode, the sensor data is not transmitted via the transceiver. In the sensor data mode, the sensor data is transmitted via the transceiver. The controller is configured to transmit the detected possible events via the transceiver without transmitting the sensor data when in the detection mode, and to transmit the sensor data via the transceiver when in the sensor data mode.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
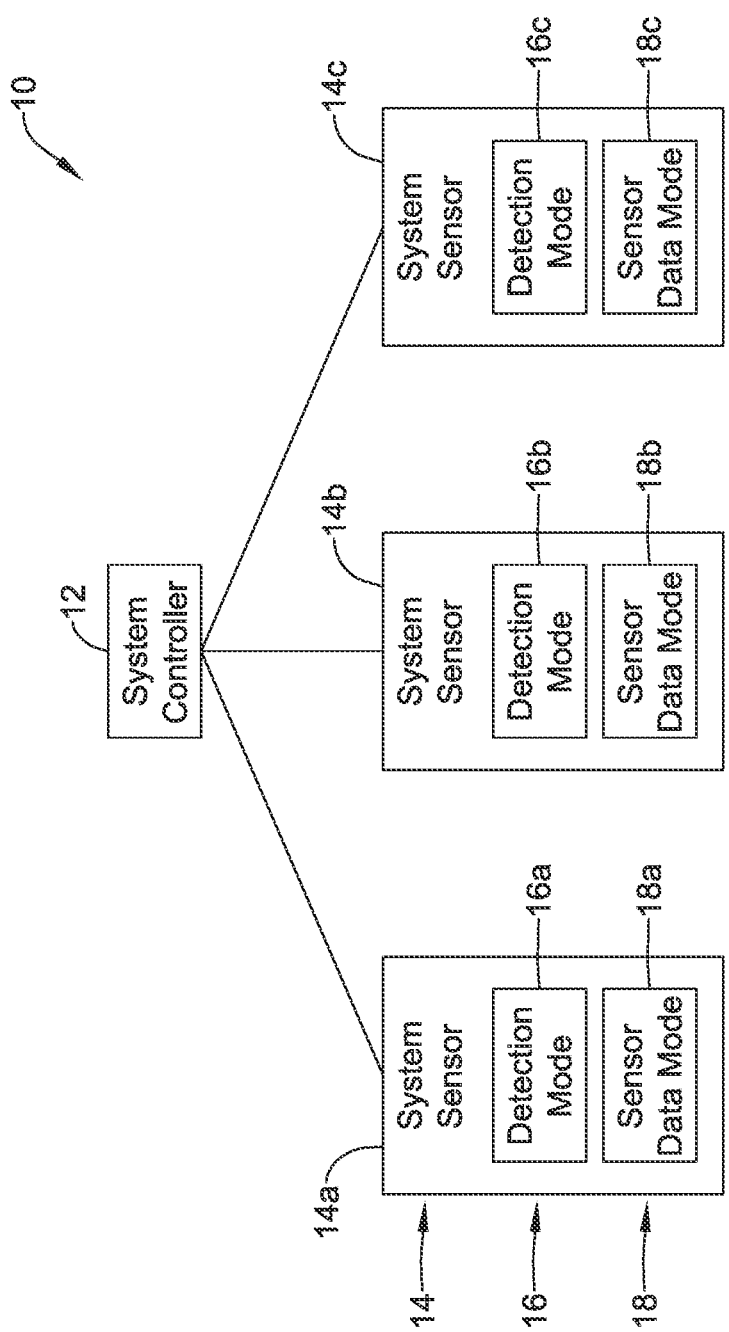
FIG. 1 is a schematic block diagram of an illustrative system for detecting events within the system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative system 10. The illustrative system 10 may be considered as representing any system that uses sensors to detect events within the system 10, and that can suffer from false alarms as a result of sensor error, sensor maintenance issues, sensor placement, and/or other reasons. The illustrative system 10 may, for example, represent an intrusion system, an HVAC system, a fire detection system, an industrial process control system, an aerospace system and others. In FIG. 1, the illustrative system 10 includes a system controller 12 that may be considered as being configured to control and/or regulate operation of at least some portions of the system 10. In some cases, the system controller 12 may be configured to communicate with and control operation of a plurality of sensors 14, while another controller (not illustrated) may control other features and functionality of the system 10.

The illustrative system 10 includes a number of the sensors 14, individually labeled as 14a, 14b, 14c. While a total of three sensors 14 are illustrated, it will be appreciated that the system 10 may include any number of sensors 14, and may include a substantially greater number of sensors 14. If the system 10 is an intrusion detection system 10, the sensors 14 may include motion sensors, glass break detectors, window and/or door opening sensors, and the like. If the system 10 is a fire detection system, the sensors 14 may include fire detection sensors, smoke detection sensors, temperature sensors and the like. If the system 10 is an HVAC system, the sensors 14 may include temperature sensors, air quality sensors, air flow sensors and the like. These are just examples, as the sensors 14 may include any number and variety of sensors. At least some of the sensors 14 may be physically separated from the others, such as by being disposed at different locations in a room of a building or even in different rooms/zones of a building, for example.

Each of the sensors 14 may be considered as including a detection mode 16 and a sensor data mode 18. The detection modes 16 are individually labeled as 16a, 16b, 16c and the sensor data modes 18 are individually labeled as 18a, 18b, 18c. It will be appreciated that the detection modes 16 and the sensor data modes 18 may each represent function blocks within the sensors 14, for example. The detection modes 16 and the sensor data modes 18 may each represent functionality that is built into each of the sensors 14. A particular sensor 14 may act differently, depending on whether that particular sensor 14 is currently in its detection mode or its sensor data mode. When the sensor 14 is in its detection mode, the sensor 14 may apply one or more algorithms to the sensor data that is generated by the sensor in order to detect a possible event, and to report the possible event to the system controller 12. The algorithms run by the sensor 14 while in detection mode may, for example, detect a possible event when the amplitude, frequency or other characteristic of the sensor data exceeds a particular event threshold. This can mean that smaller, lower magnitude signals may be essentially ignored, or at least, are not reported to the system controller 12. When in the detection mode, the sensor data itself is not reported to the system controller 12. In some cases, one or more parameters representative of the sensor data, resulting from the algorithm(s) run on the sensor data, may be reported to the system controller 12, but this is not required. When the sensor 14 is in the sensor data mode, the sensor data itself is reported to the system controller 12. This may include the raw sensor data as produced by the sensor. In some cases, the raw sensor data is filtered other otherwise conditioned before being reported to the system controller 12, but this is not required. The sensors 14 may default to detection mode, and may only switch to sensor data mode when instructed to do so by the system controller 12, as will be discussed.

In some cases, when the system controller 12 receives a communication from one of the sensors 14 that a possible event has been detected, there may be some concern as to whether the particular sensor 14 accurately detected an actual event, as opposed to a false alarm of some sort. In order to provide a measure of confidence in the possible event, the system controller 12 may, upon being informed of the possible event, determine which of the other sensors 14 may be positioned or are otherwise capable of detecting some sort of indication of the same possible event, even if the detection algorithm(s) of the other sensors 14 did not detect something that would have arisen to the level at which the other sensors 14 detect and reported a possible event. In some cases, it is possible that one or more other sensors 14, regardless of whether they are of the same type of sensor as the reporting sensor 14, may have detected or otherwise can produce sensed information that can corroborate or at least partially corroborate the findings of the reporting sensor 14.

In some cases, a sensor 14 that has been instructed to switch from its detection mode to its sensor data mode may remain in its sensor data mode for a particular period of time, long enough to corroborate or not corroborate the possible event reported by the reporting sensor 14. In some cases, a sensor 14 that has been instructed to switch from its detection mode to its sensor data mode may remain in its sensor data mode until such time as the system controller 12 instructs that sensor 14 to revert to its detection mode. To illustrate, assume the system 10 is an HVAC system, and the sensor 14 reporting a possible event is a temperature sensor reporting a current temperature that is well below a desired temperature set point. Other sensors that have not detected an event, but possess sensor data that may be relevant to confirming, providing a confidence level and/or diagnosing the detected possible event, may be switched to their sensor data mode and report their sensor data.

As another example, an occupancy sensor or a motion sensor may be reporting an increase in the number of people in a space. The system controller 12 may instruct nearby sensors such as carbon dioxide sensors to switch into their sensor data modes, such that those other sensors can provide their sensor data to the system controller 12. The carbon dioxide sensor may, for example, report raw sensor data that may provide corroboration that the reporting occupancy sensor or motion sensor is correct, by reporting for example an elevated carbon dioxide concentration, but not high enough by itself to trigger a possible event. These are just examples.

In some cases, each of the sensors 14a, 14b and 14c may include a First-In-First-Out (FIFO) buffer or other memory (not explicitly shown) that stores the sensor data sensed by the corresponding sensor for at least a period of time, resulting in a cache of historical sensor data. At least some of the historical sensor data may be included in the sensor data that is reported by the reporting sensor 14.

Figure 2:
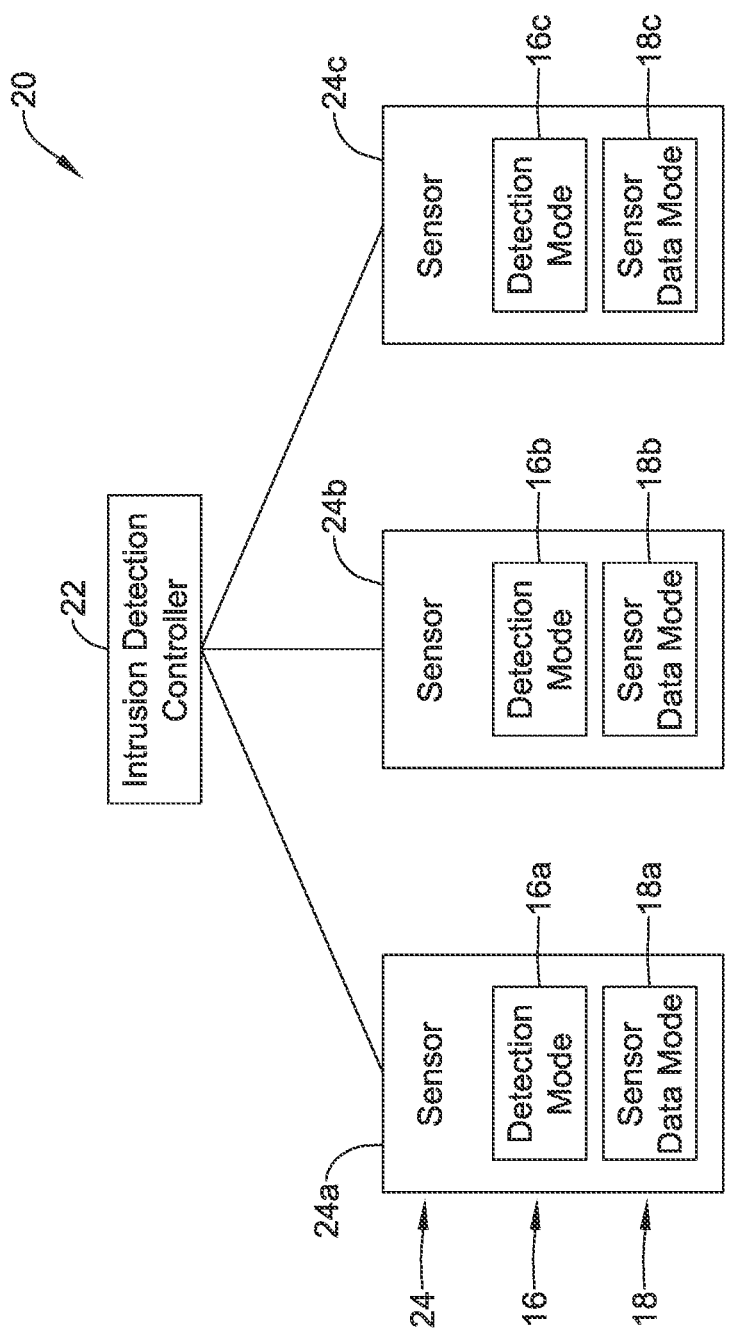
FIG. 2 is a schematic block diagram of an illustrative intrusion detection system providing an example of the illustrative system of FIG. 1.

FIG. 2 is a schematic block diagram of an illustrative intrusion detection system 20 that may be considered as being a particular example of the system 10 described with respect to FIG. 1. The intrusion detection system 20 includes an intrusion detection controller 22 that may be considered as being configured to control and/or regulate operation of at least some portions of the intrusion detection system 20. The intrusion detection system includes a number of sensors 24, individually labeled as 24a, 24b, 24c. While a total of three sensors 24 are illustrated, it will be appreciated that the system 20 may include any number of sensors 24, and may include a substantially greater number of sensors 24. At least some of the sensors 24 may be physically separated, such as by being disposed within different regions of a room or even in different rooms of a building, for example. The sensors 14 may include motion sensors, glass break detectors, window or door opening sensors, and/or the like.

Each of the sensors 24 may be considered as including a detection mode 16 and a sensor data mode 18. The detection modes 16 are individually labeled as 16a, 16b, 16c and the sensor data modes 18 are individually labeled as 18a, 18b, 18c. It will be appreciated that the detection modes 16 and the sensor data modes 18 may each represent function blocks within the sensors 24, for example. The detection modes 16 and the sensor data modes 18 may each represent functionality that is built into each of the sensors 24. A particular sensor 24 may act differently, depending on whether that particular sensor 24 is currently in its detection mode or its sensor data mode. When the sensor 24 is in its detection mode, the sensor 24 may apply one or more detection algorithms to the sensor data that is generated by the sensor element of the sensor in order to detect a possible intrusion event, and to report the possible intrusion event to the intrusion detection controller 22. The algorithms run by the sensor 24 while in detection mode may, for example, detect a possible event when the amplitude, frequency, signal signature or other characteristic of the sensor data exceeds a particular event threshold. This can mean that smaller, lower magnitude signals may be essentially ignored, or at least, are not reported to the intrusion detection controller 22. When in the detection mode, the sensor data itself is not reported to the intrusion detection controller 22. In some cases, one or more parameters representative of the sensor data, resulting from the algorithm(s) run on the sensor data, may be reported to the intrusion detection controller 22, but this is not required. When the sensor 24 is in the sensor data mode, the sensor data itself is reported to the intrusion detection controller 22. This may include the raw sensor data as produced by the sensor 24. In some cases, the raw sensor data is filtered or otherwise conditioned before being reported to the intrusion detection controller 22, but this is not required. In some cases, the raw sensor data is unfiltered or otherwise not conditioned before being reported to the intrusion detection controller 22. The sensors 24 may default to detection mode, and may only switch to sensor data mode when instructed to do so by the system controller 12, as will be discussed.

In some cases, when the intrusion detection controller 22 receives a communication from one of the sensors 24 that a possible intrusion event has been detected, there may be some question as to whether the particular sensor 24 accurately detected an actual intrusion event, as opposed to a false alarm of some sort. In order to provide a measure of confidence, the intrusion detection controller 22 may, upon being informed of a possible event, determine which of the other sensors 24 may be positioned or are otherwise capable of detecting some sort of indication of the same possible event, even if the detection algorithm(s) of the other sensors 24 did not detect something that would have arisen to the level at which the other sensors 24 detect and reported a possible event. In some cases, it is possible that one or more other sensors 24, regardless of whether they are of the same type of sensor as the reporting sensor 24, may have detected or otherwise can produce sensed information that can corroborate or at least partially corroborate the findings of the reporting sensor 24.

As an example, say that the reporting sensor 24 is a motion sensor. Nearby sensors 24 that may be instructed to switch over to sensor data mode and provide their raw sensor data to the intrusion detection controller 22 may include other motion sensors and/or may include other types of sensors, such as vibration sensors and glass break detectors. A motion sensor that is near a possible intrusion event, but not close enough to raise a signal that exceeds an intrusion detection threshold, may generate a smaller signal that can provide information that can be used to help corroborate and/or provide a confidence level in the possible intrusion event. In some cases, the sensor data from the other sensors may be fused or otherwise considered in combination to help corroborate and/or provide a confidence level in the possible intrusion event. A glass break detector may not detect the sounds or vibrations of glass breaking, particularly if it is not close enough to the possible intrusion event, but its raw sensor data may indicate an indication of detected footsteps, for example, or a glass break signature that does not meet a glass break threshold.

When one of the sensors 14 reports a possible intrusion event to the intrusion detection controller 22, the intrusion detection controller 22 is configured to take a series of steps. For example, the intrusion detection controller 22 instructs one or more of the other sensors 24, other than (or in addition to) the sensor 24 that reported the possible intrusion event, to switch from the detection mode 16 to the sensor data mode 18. The intrusion detection controller 22 receives the sensor data from the one or more of the other sensors 24 that were switched to the sensor data mode. The intrusion detection controller 22 is configured to process the received sensor data to confirm and/or provide a measure of confidence in the reported possible intrusion event. In some cases, the number of sensors 24 are physically spaced from one another. This may mean that the sensors 24 are in different rooms, or in different portions of a large space, for example.

In some cases, each of the sensors 24 may be configured to default to being in the detection mode 16 unless instructed by the intrusion detection controller 22 to switch to the sensor data mode 18. The sensors 24 that were switched to the sensor data mode 18 may be configured to remain in sensor data mode 18 for a period of time and to automatically revert back to the detection mode 16 after the period of time expires. The period of time may be determined to be sufficient to either corroborate or not corroborate the reported possible intrusion event. The period of time may be set equal to one minute, or five minutes, for example. Other time periods are also contemplated. In some cases, the one or more of the sensors 24 that were switched to the sensor data mode 18 are configured to remain in the sensor data mode 18 until the intrusion detection controller 22 subsequently instructs the sensor 24 to revert back to the detection mode 16.

In some case, the number of sensors 24 include sensors of a plurality of different sensor types. The received sensor data, which the intrusion detection controller 22 receives from the sensors 24 that were instructed to switch to the sensor data mode 18, may include sensor data from two or more different sensor types. In some cases, the received sensor data may be fused or otherwise processed, such as by using machine learning, in order to confirm or otherwise provide the measure of confidence in the reported possible intrusion event. In some instances, the intrusion detection controller 22 may be configured to use the measure of confidence in the reported possible intrusion event to ascertain whether the reported possible intrusion event is legitimate, or represents a false alarm.

Figure 3:
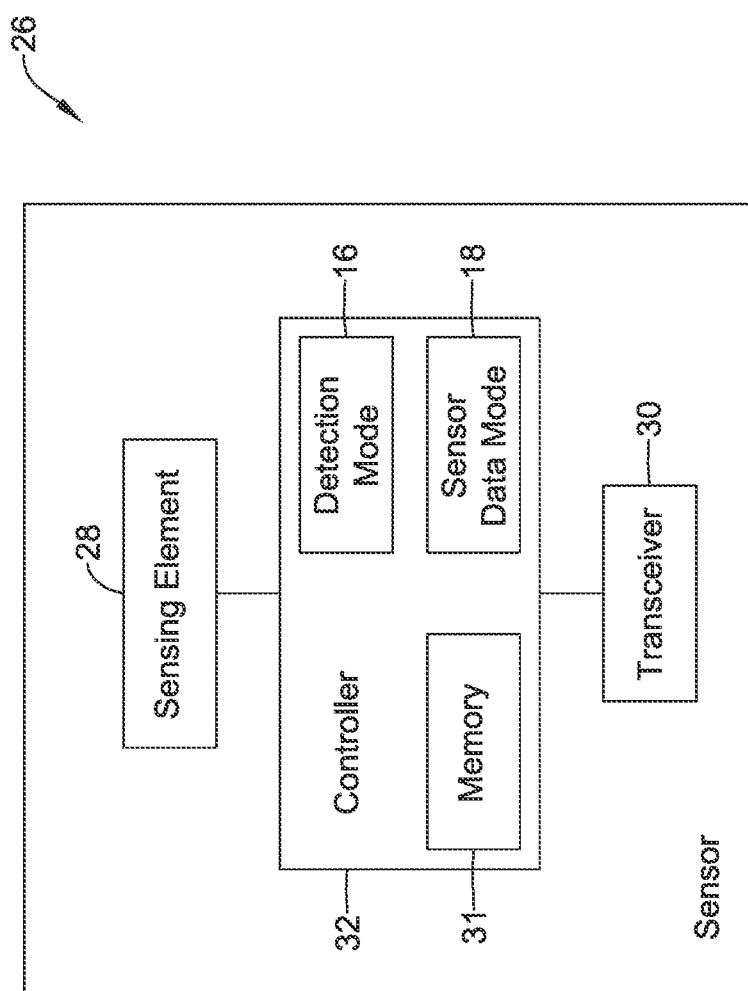
FIG. 3 is a schematic block diagram of an illustrative sensor usable in the illustrative system of FIG. 1.

FIG. 3 is a schematic block diagram of an illustrative sensor 26 that may be considered as being representative of one of the sensors 14 or the sensors 24. The illustrative sensor 26 includes a sensing element 28 that is configured to sense a sensed condition and to output raw sensor data. The sensing element 28 may, for example, be a motion detector, a glass break detector, an asset protection sensor, an occupancy sensor or a vibration sensor. The illustrative sensor 26 also includes a transceiver 30, and a controller 32 that is operably coupled with the sensing element 28 and with the transceiver 30. In some cases, the transceiver 30 may be a wireless transceiver. In other cases, the transceiver 30 is a wired transceiver. The detection mode 16 and the sensor data mode 18 are graphically represented as being part of the controller 32. These may represent functionality built or programmed into the controller 32, for example.

The controller 32 is configured to receive the sensor data from the sensing element 28 as well as to receive instructions via the transceiver 30 that instructs the sensor 26 to switch between the detection mode 16 and the sensor data mode 18. When in the detection mode 16, the controller 32 is configured to apply one or more detection algorithms to the sensor data in order to detect a possible event and to report out the possible event via the transceiver 30. The detected possible events are transmitted via the transceiver 30 when in the detection mode 16 but the sensor data is not transmitted via the transceiver when in the detection mode 16. When in the sensor data mode 18, the sensor data is transmitted via the transceiver 30.

In some cases, the controller 32 may include a First-In-First-Out (FIFO) buffer or other memory 31 that stores the sensor data sensed by the sensing element 28 for at least a period of time, resulting in a cache of historical sensor data. At least some of the historical sensor data may be included in the sensor data that is reported by the sensor 26.

Figure 4:
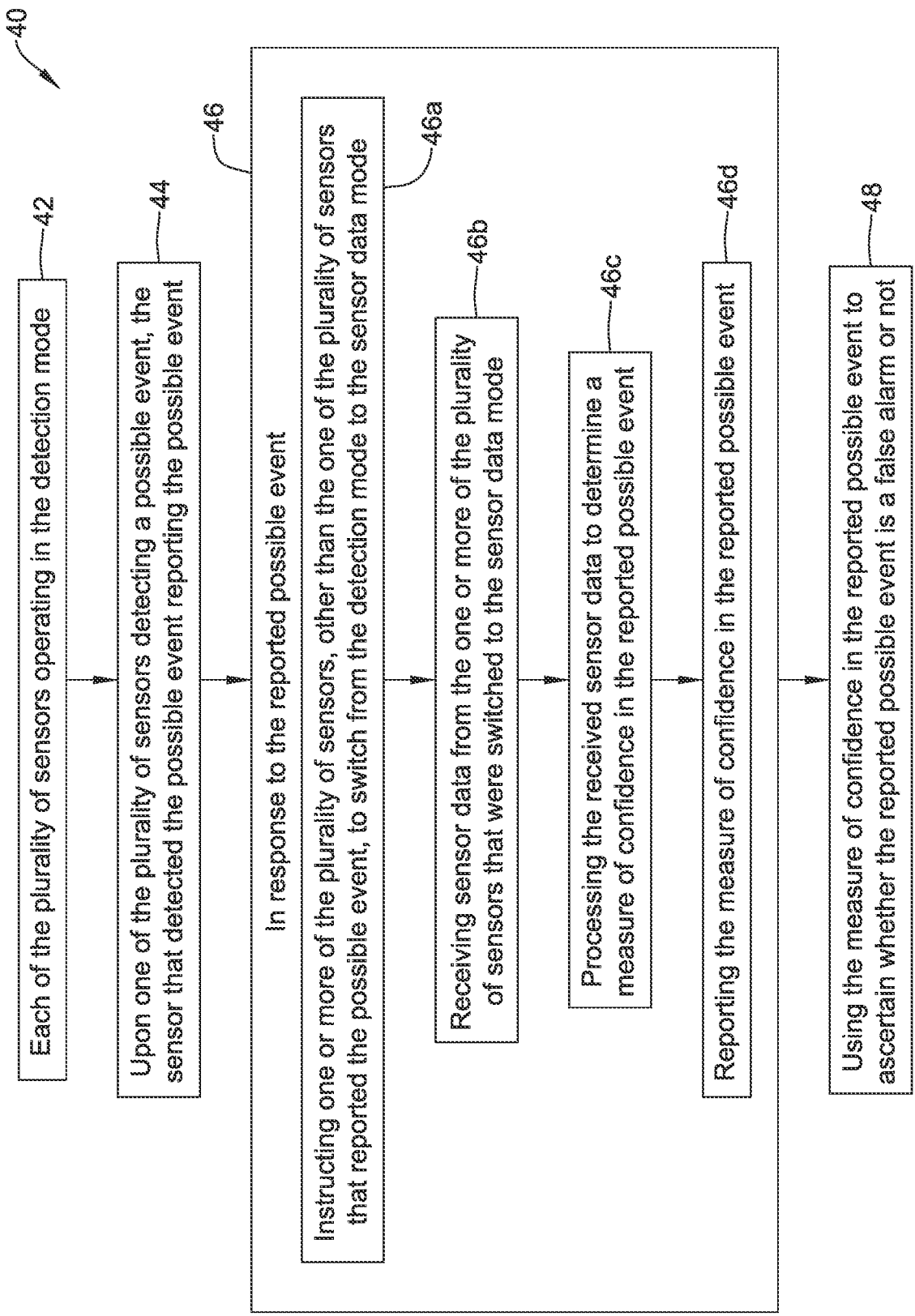
FIG. 4 is a flow diagram showing an illustrative method that may be carried out via the illustrative system of FIG. 1.

FIG. 4 is a flow diagram showing an illustrative method 40 for detecting events using a plurality of sensors (such as the sensors 14 or the sensors 24), wherein each of the plurality of sensors includes a detection mode (such as the detection mode 16) and a sensor data mode (such as the sensor data mode 18). The illustrative method 40 includes each of the sensors operating in the detection mode, as indicated at block 42. Upon one of the plurality of sensors detecting a possible event, the sensor that detected the possible event reports the possible event, as indicated at block 44. In response to the reported possible event, as indicated at block 46, one or more of the plurality of sensors, other than (or in addition to) the one of the plurality of sensors that reported the possible event, are instructed to switch from the detection mode to the sensor data mode, as indicated at block 46a. Sensor data is received from the one or more of the plurality of sensors that were switched to the sensor data mode, as indicated at block 46b. The received sensor data is processed to confirm or otherwise determine a measure of confidence in the reported possible event, as indicated at block 46c. The measure of confidence in the reported possible event is reported, as indicated at block 46d. In some cases, the method 40 may further include using the measure of confidence in the reported possible event to ascertain whether the reported possible event is a false alarm or not, as indicated at block 48.

In some cases, processing the received sensor data includes assigning a different weighting value to the sensor data received from at least two of the sensors that were instructed to switch to the sensor data mode. As an example, assume there are two motion detectors M1 and M2 and a glass break detector G1. Assume the motion detector M1 first detects motion. In response, the motion detector M2 and the glass break detector G1 are both placed into sensor data mode. A confidence value can be calculated by summing M1*w1 and M2*w2 and G1*w3, where w1+w2+w3 equals 1. The logic is that M2 will have some relevant data, but probably not above its event detection threshold, since M2 is farther away from the possible intruder than the other motion detector M1. Although the glass break detector G1 is designed to detect breaking glass, the glass break detector G1 may pick up a smaller signal indicating possible footsteps, or a door break, for example. In some cases, a relatively greater weight may be given to the sensor that reported the possible incident. In some instances, a greater weight may be given to sensor data from other sensors that are the same type of sensor as the reporting sensor relative to the weight given to sensor data from other sensors that are of a different type of sensor as the reporting sensor, but this is not required.

In some cases, processing the received sensor data may include utilizing a neural network. Any activation function may be used with the neural network, including but not limited to sigmoid, tan h, relu, leaky relu and others. Over time, the neural network can be tuned using learning optimizers such as but not limited to gradient descent, adaptive gradient descent, RMS (root mean square) and others, based upon back propagation of relative weights.

Figure 5:
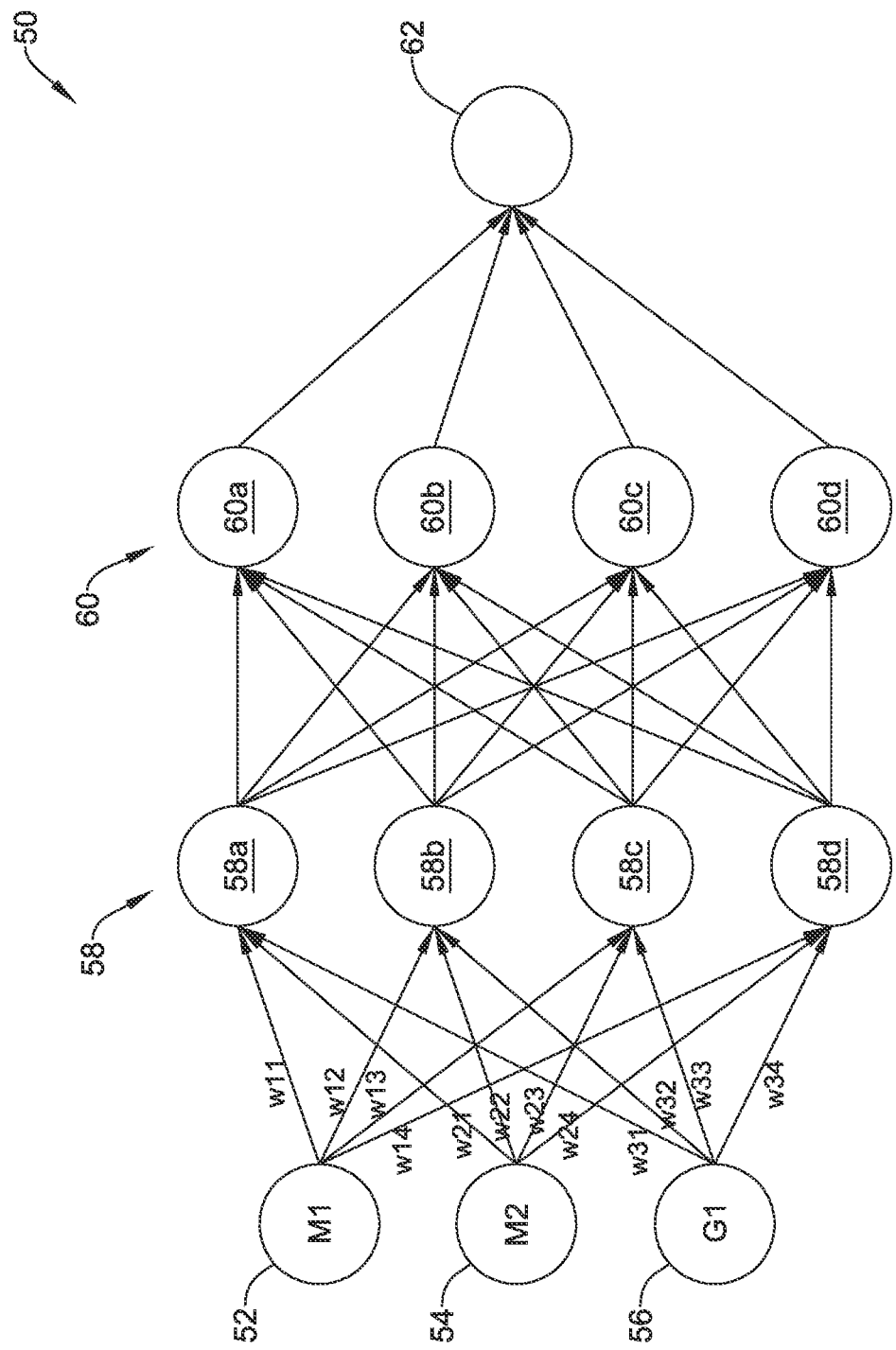
FIG. 5 is a schematic block diagram of an example of how a deep neural network may be used with an intrusion detection system.

FIG. 5 is a schematic block diagram of an example of how a deep neural network may be used with an intrusion detection system such as the intrusion detection system 20.

FIG. 5 shows a simplified neural network 50 that includes a motion detector M1 labeled 52, a motion detector M2 labeled 54 and a glass break detector G1 labeled 56. Raw sensor data flows to a first hidden layer 58 and a second hidden layer 60. While only a first hidden layer 58 and a second hidden layer 60 are shown, it will be appreciated that there may be additional hidden layers as well. The sensors 52, 54, 56 in combination may be considered as forming an input layer. The raw sensor data from each of the sensors 52, 54, 56 flows to the first hidden layer 58, and then on to the second hidden layer 60 (and any additional hidden layers). Data from each sensor 52, 54, 56 flows to each component 58a, 58b, 58c, 58d along with a relative weighting for each. Similarly, data flows from each component 58a, 58b, 58c, 58d of the first hidden layer 58 to each component 60a, 60b, 60c, 60d of the second hidden layer 60. The second hidden layer 60 outputs to an output layer 62, which indicates whether there is an actual alarm, and what the confidence score is for that alarm. This is just an example.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A detection system comprising:
   a detection controller;
   a plurality of sensors operatively coupled to the detection controller;
   each of the plurality of sensors includes:
      a detection mode in which the corresponding sensor applies one or more detection algorithms to sensor data generated by the corresponding sensor to detect a possible event and to report the possible event to the detection controller, wherein in the detection mode, at least some of the sensor data is not reported to the detection controller;
      a sensor data mode in which at least some of the sensor data that is not reported to the detection controller in the detection mode is reported to the detection controller;
   when one of the plurality of sensors reports a possible event to the detection controller, the detection controller is configured to:
      instruct one or more of the plurality of sensors to switch from the detection mode to the sensor data mode;
      receive from each of the one or more of the plurality of sensors that were switched to the sensor data mode at least some of the sensor data that is not reported to the detection controller when the corresponding sensor is in the detection mode; and
      process the received sensor data to determine a measure of confidence in the reported possible event.

2. The detection system of claim 1, wherein:
   for each of the plurality of sensors:
      in the detection mode, at least some of the sensor data that is not reported to the detection controller is stored in a memory of the corresponding sensor for at least a period of time resulting in a cache of historical sensor data; and
      in the sensor data mode, at least some of the sensor data that is reported to the detection controller includes at least some of the historical sensor data.

3. The detection system of claim 1, wherein the plurality of sensors are physically spaced from one another.

4. The detection system of claim 1, wherein each of the plurality of sensors is configured to default to the detection mode unless instructed by the detection controller to switch to the sensor data mode.

5. The detection system of claim 1, wherein the one or more of the plurality of sensors that were switched to the sensor data mode are configured to remain in sensor data mode for a period of time and to automatically revert back to the detection mode after the period of time expires.

6. The detection system of claim 1, wherein the one or more of the plurality of sensors that were switched to the sensor data mode are configured to remain in the sensor data mode until the detection controller subsequently instructs the corresponding sensor to revert back to the detection mode.

7. The detection system of claim 1, wherein the detection controller is configured to use the measure of confidence in the reported possible event to ascertain whether the reported possible event is a false alarm.

8. The detection system of claim 1, wherein the detection algorithm processes the sensor data generated by the corresponding sensor to determine when an event threshold has been crossed, indicating a detected possible event.

9. The detection system of claim 1, wherein in the sensor data mode, the sensor data is filtered before it is reported to the detection controller.

10. The detection system of claim 1, wherein in the sensor data mode, the sensor data is unfiltered when reported to the detection controller.

11. The detection system of claim 10, wherein in the sensor data mode, the sensor data is raw sensor data as generated by the corresponding sensor when reported to the detection controller.

12. The detection system of claim 1, wherein the plurality of sensors comprises sensors of a plurality of different sensor types.

13. The detection system of claim 12, wherein the received sensor data includes sensor data from two or more different sensor types.

14. The detection system of claim 1, wherein the received sensor data is processed using machine learning to determine the measure of confidence in the reported possible event.

15. A method for detecting events using a plurality of sensors, wherein each of the plurality of sensors includes a detection mode and a sensor data mode, the method comprising:
   in the detection mode, each of the plurality of sensors applies one or more detection algorithms to sensor data generated by the corresponding sensor to detect a possible event and to report the possible event, wherein at least some of the sensor data is stored in a memory of the corresponding sensor for at least a period of time resulting in a cache of historical sensor data;
   in response to one of the plurality of sensors reporting a possible event:
      instructing one or more of the plurality of sensors to switch from the detection mode to the sensor data mode;
      receiving at least some of the sensor data, including at least some of the historical sensor data, from the one or more of the plurality of sensors that were switched to the sensor data mode; and processing the received sensor data to determine a measure of confidence in the reported possible event.

16. The method of claim 15, further comprising using the measure of confidence in the reported possible event to ascertain whether the reported possible event is a false alarm or not.

17. The method of claim 15, further comprising:

in response to one of the plurality of sensors reporting a possible event, instructing two or more of the plurality of sensors to switch from the detection mode to the sensor data mode, and wherein processing the received sensor data comprises assigning a different weighting value to the sensor data receive from two or more of the plurality of sensors that were instructed to switch to the sensor data mode.

18. The method of claim 15, wherein processing the received sensor data comprises providing at least some of the received sensor data to a neural network for processing by the neural network.

19. A sensor comprising:

a sensing element configured to sense a sensed condition and output sensor data;

a memory;

a communication port;

a controller operably coupled with the sensing element, the memory and the communication port, the controller configured to:

receive the sensor data from the sensing element;

store at least some of the received sensor data in the memory for at least a period of time resulting in a cache of historical sensor data;

receive instructions via the communication port instructing the sensor to switch between:

a detection mode, in which the controller applies one or more detection algorithms to the sensor data to detect a possible event and report the possible event via the communication port, wherein in the detection mode, at least some of the sensor data, including at least some of the historical sensor data, is not transmitted via the communication port;

a sensor data mode, in which at least some of the sensor data that is not transmitted in the detection mode, including at least some of the historical sensor data, is transmitted via the communication port;

transmit the detected possible events via the communication port when in the detection mode; and transmit at least some of the sensor data, including at least some of the historical sensor data, via the communication port when in the sensor data mode.

20. The sensor of claim 19, wherein the sensing element comprises a motion detector, a glass break detector, an asset protection sensor, an occupancy sensor or a vibration sensor.

* * * * *